(No Model.)

R. A. FISHER.
RIB TIP RETAINER FOR UMBRELLAS, &c.

No. 266,589. Patented Oct. 24, 1882.

Witnesses;

Inventor;
Robert A. Fisher
per attys.
A. H. Evans & Co.

N. PETERS. Photo-Lithographer, Washington, D. C.

UNITED STATES PATENT OFFICE.

ROBERT A. FISHER, OF PHILADELPHIA, PENNSYLVANIA.

RIB-TIP RETAINER FOR UMBRELLAS, &c.

SPECIFICATION forming part of Letters Patent No. 266,589, dated October 24, 1882.

Application filed July 31, 1882. (No model.)

*To all whom it may concern:*

Be it known that I, ROBERT A. FISHER, of the city of Philadelphia and State of Pennsylvania, have invented certain new and useful Improvements in Rib-Tip Retainers for Parasols and Umbrellas, of which the following is a clear, full, and exact description, reference being had to the accompanying drawings, making a part of this specification, in which—

Figure 1:
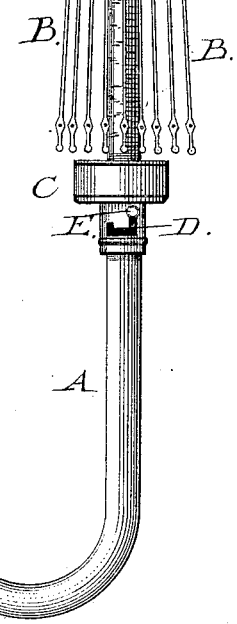
Figure 2:
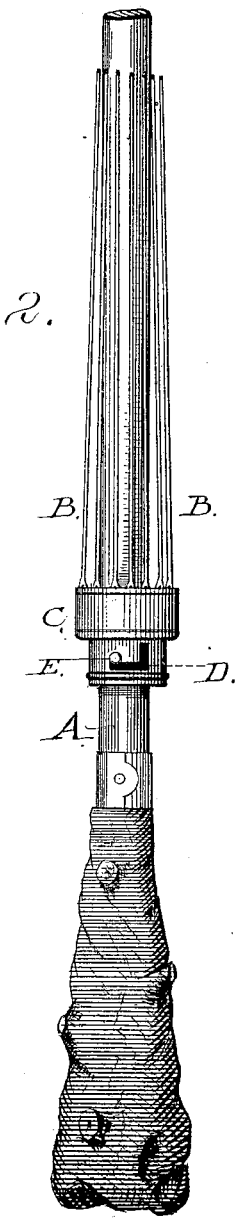

Figure 1 is a side elevation with the retainer removed from the tips. Fig. 2 is the same with the retainer inclosing the tips.

My invention relates to a device whereby a retainer, when placed in proper position to hold together the rib-tips of a parasol or umbrella, must remain in such position, and thereby perfectly accomplish its object, until intentionally moved in order to release the rib-tips from confinement. Many devices have been tried to accomplish this end. Some depend upon the natural spring of the umbrella-ribs to cause sufficient friction between the rib-tips and retainer to hold the latter in the desired position. Others depend upon the springing of the rib-tips into a groove formed upon the edge of the retainer. Still another device is intended to cause friction by means of a spring placed within the retainer itself. Any device that depends only upon friction to accomplish its object sooner or later fails, because by use or handling the retainer slips off the rib-tips and releases them from their confinement. This difficulty is overcome by the tip-holder patented to David Elkan, September 15, 1874, No. 155,076, by means of sleeves, cap, and spring, secured in position on the stick by a pin, which affords a positive lock, but such is not my invention.
My invention combines simplicity and cheapness with an efficiency not hitherto attained.

To enable others skilled in the art to make and use my invention, I will proceed to describe the exact manner in which I have carried it out.

In the drawings, A represents the staff of an umbrella or parasol. B B are the rib-tips, and C the retainer, which consists essentially of an irregularly shaped or expanded tube of metal or other suitable material, which can be made of two or more pieces of different diameter, or else by forming a single piece into the required shape.

D is an L-shaped slot, of such width as to permit its free movement upon a pin, E, firmly fastened into the staff of the parasol or umbrella. The precise shape of the slot is not material. It may be formed of curves instead of straight lines and angles, without departing from the spirit of my invention. More than one slot may be made in the retainer, with corresponding number of pins fastened in the staff of the umbrella; but I prefer to use the general form of an L-shaped slot, as shown in the annexed drawings.

Fig. 1 shows the retainer unlocked and slipped off from the rib-tips of the umbrella. To bring together and lock the rib-tips in the retainer, as shown in Fig. 2, it is only necessary to bring together the rib-tips with one hand, and then with the other hand to slide down the retainer as far as the pin E will permit, then turn the retainer until its further revolution is prevented by the pin E, and finally to give a slight upward movement to the retainer, whereby the end of the slot is brought to bear firmly against the pin. This gives a positive lock to the retainer. By reversing the above movements the retainer is unlocked and the rib-tips released.

I am aware that retainers have been made with locking-pins; but these retainers have been constructed to slide over an inner sleeve provided with slots for the reception of the locking-pins, but such is not my invention.

I am aware that transverse L-shaped slots have been used in sleeves used on umbrellas, but such is not my invention, as I do not claim such transverse slots, broadly.

Having thus described my invention, what I claim as new, and desire to secure by Letters Patent, is—

The rib-tip retainer C, provided with the L-shaped transverse slot D, in combination with the staff of an umbrella or parasol provided with locking-pin E, all constructed and arranged to operate substantially as and for the purpose set forth.

ROBERT A. FISHER.

Witnesses:
EDWARD P. NIXON,
W. H. NIXON.